(12) United States Patent
Burges et al.

(10) Patent No.: US 7,526,181 B2
(45) Date of Patent: Apr. 28, 2009

(54) SYSTEM AND METHOD FOR AUTOMATICALLY CUSTOMIZING A BUFFERED MEDIA STREAM

(75) Inventors: Chris Burges, Bellevue, WA (US); Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 10/987,365

(22) Filed: Nov. 12, 2004

(65) Prior Publication Data

US 2006/0092282 A1 May 4, 2006

Related U.S. Application Data

(62) Division of application No. 10/980,683, filed on Nov. 2, 2004.

(51) Int. Cl.
H04N 5/94 (2006.01)
(52) U.S. Cl. .............................. 386/46; 386/45; 386/95; 386/96; 386/125; 386/126; 709/231; 707/4
(58) Field of Classification Search .................... 386/1, 386/46, 95, 96, 125, 126
See application file for complete search history.

(56) References Cited

U.S. PATENT DOCUMENTS 6,216,173 B1 * 4/2001 Jones et al. .................. 715/705
6,845,398 B1 * 1/2005 Galensky et al. ............ 709/231
6,910,035 B2 * 6/2005 Hoekman et al. ............. 707/4
2003/0146915 A1 * 8/2003 Brook et al. ................. 345/473

* cited by examiner

*Primary Examiner*—Thai Tran
*Assistant Examiner*—Jamie J Atala
(74) *Attorney, Agent, or Firm*—Lyon & Harr, LLP; Mark A. Watson

(57) ABSTRACT

A "media stream customizer" customizes buffered media streams by inserting one or more media objects into the stream to maintain an approximate buffer level. Specifically, when media objects such as songs, jingles, advertisements, etc., are deleted from the buffered stream (based on some user specified preferences), the buffer level will decrease. Therefore, over time, as more objects are deleted, the amount of the media stream being buffered continues to decrease, thereby limiting the ability to perform additional deletions from the stream. To address this limitation, the media stream customizer automatically chooses one or more media objects to insert back into the stream, and ensures that the inserted objects are consistent with any surrounding content of the media stream, thereby maintaining an approximate buffer level. In addition, the buffered content can also be stretched using pitch preserving audio stretching techniques to further compensate for deletions from the buffered stream.

31 Claims, 3 Drawing Sheets

SYSTEM AND METHOD FOR AUTOMATICALLY CUSTOMIZING A BUFFERED MEDIA STREAM

CROSS REFERENCE TO RELATED APPLICATIONS

This application is a Divisional Application of U.S. patent application Ser. No. 10/980,683, filed on Nov. 2, 2004, by Herley, et al., and entitled "A SYSTEM AND METHOD FOR AUTOMATICALLY CUSTOMIZING A BUFFERED MEDIA STREAM."

BACKGROUND

1. Technical Field

The invention is related to maintaining buffered media streams from which media objects are being deleted, and in particular, to a system and method for providing automatic and real-time insertion of media objects into the media stream to maintain a minimum buffer level when objects are deleted from the media stream during playback of the media stream, and wherein similarity information between media objects is used to determine which media objects to insert into the stream to limit abrupt transitions in the media stream.

2. Related Art

There are many existing schemes for identifying audio and/or video objects, such as particular advertisements, station jingles, or songs, embedded in an audio stream. For example, many such schemes use "audio fingerprinting" techniques for identifying objects in the stream by computing and comparing parameters of the media stream, such as, for example, frequency content, energy levels, etc., to a database of known objects. In particular, sampled portions of the media stream are typically analyzed and compared to fingerprints in the database for identification purposes. Endpoints of individual media objects within the media stream are then often determined using either fingerprints, metadata, or other queues embedded in the media stream.

Other conventional schemes operate to identify media objects that repeat in the media stream without necessarily providing an identification of those objects. In other words, these schemes are capable of identifying instances within a media stream where objects that have previously occurred in the media stream are repeating, such as, for example, some unknown song or advertisement which is played two or more times on a radio station. There are a number of conventional methods for providing such identifications. In this case, endpoints of repeating media objects may be determined using fingerprints, metadata, queues embedded in the stream, or by a direct comparison of repeating instances of particular media objects within the media stream to determine where the media stream around those repeating objects diverges.

Regardless of how particular media objects are identified in the media stream, and how the endpoints of those objects are located, the object identification and endpoint information is then frequently used for any of a number of purposes, including, for example, segmentation of the media stream into discrete objects, generation of historical media stream playlists, or simply cataloging the media stream.

Other uses of such object identification and endpoint information include automatic modification of a buffered media stream. For example, one conventional scheme allows users to associate commands or actions to be performed whenever particular media objects occur in the media stream. One example of such commands is to delete or skip a particular media object when it occurs in the media stream. This scheme also monitors an amount of the media stream remaining in the buffer. Then, if the buffered content ever drops below a predetermined minimum time, one or more previously stored media objects may be automatically inserted back into the media stream so that the buffer never runs empty. Objects are chosen for insertion either randomly, or based on user ratings assigned to particular media objects in a user's library, with higher rated objects being weighted more heavily when choosing objects for insertion.

However, many media streams, such as, for example, most radio broadcasts, frequently play songs that are complementary to one another. In other words, such media streams, especially when the stream is carefully compiled by a disk jockey or the like, often play similar songs or musical themes. In fact, such media streams typically smoothly transition from one song to the next, such that the media stream does not abruptly jump or transition from one musical style or tempo to another during playback.

Unfortunately, as noted above, conventional methods for maintaining a buffered media stream from which objects are being deleted typically insert songs or other media objects either randomly, or based on some predetermined user preference or rating, to maintain buffer length. Consequently, such schemes frequently produce a media stream which has apparent discontinuities within the theme or mood of the media stream when presented to the user or listener during playback.

Therefore, what is needed is a system and method for efficiently identifying media objects and their endpoints within a media stream which are to be deleted from the media stream. Further, this system and method should then identify media objects which will fit within the overall theme or mood of the media stream to replace the deleted media objects. Consequently, when such objects are inserted into the media stream to maintain the buffer size, the listener should not notice apparent discontinuities in the overall theme or mood of the buffered media stream during playback of the media stream.

SUMMARY

A "media stream customizer," as described herein, operates to solve the aforementioned problems by automatically customizing an incoming media stream which is at least partially buffered prior to playback. Customization of the media stream is accomplished by inserting one or more media objects into the stream between existing media objects to maintain an approximate duration of buffered content when one or more objects are deleted from the incoming media stream, either prior to, or during playback of those objects. Deletions from the media stream are either automatic, in response to direct user action, or some combination thereof. Further, the selection of which media objects are to be inserted into the stream, and where in the stream the objects are to be inserted, is based on an analysis of a similarity between available media objects and the existing media objects within the stream to either side of the objects to be inserted.

In addition, the buffered content can also be stretched using pitch preserving audio stretching techniques to further compensate for deletions from the buffered stream. Further, in a related embodiment, pitch preserving audio compression techniques are used to gradually reduce the buffer size in the event that media objects which are longer than the gap they replace are added to the buffer.

For example, given a buffered media stream, when media objects including, for example, songs, jingles, advertisements, or station identifiers are deleted from the stream (based either on some user specified preference as to those objects, or in response to direct user action during playback of those objects), the amount of the incoming media stream being buffered will naturally decrease with each deletion. Therefore, over time, as more objects are deleted, the amount of the media stream currently maintained in the buffer continues to decrease. As a result, the ability to perform additional deletions from the stream during playback becomes increasing limited over time.

Therefore, to address this limitation, the media stream customizer automatically analyzes the media stream and a library of media objects (either preexisting or generated from the stream itself), and chooses one or more media objects to insert back into the stream to replenish the shrinking buffer. Further, the selection of which objects are to be inserted is made in such a way as to minimize any perceivable discontinuities in the overall theme or mood of the buffered media stream when presented to a human listener during playback.

In an alternate embodiment, if no suitable media object is found, the content of the buffer is played back at a reduced speed while preserving the pitch of the audio, so that the buffer can grow back towards a desired default size. Further, embodiments using audio stretching to compensate for targeted deletions from the media stream can also be used in combination with selective insertions of objects into the media stream, as described above. One example where this technique works well is to stretch playback of the buffered audio to compensate for deletions of relatively short objects such as jingles, short commercials, or station identifiers, while inserting complementary media objects into the stream to compensate for longer deletions of objects such as songs or large blocks of commercials or advertisements. In still further related embodiments, the size of the buffer is reduced by compressing (and thus speeding up) playback of the buffered content. As noted above, this embodiment is useful in the case where objects inserted into the buffer are longer than a gap in the buffer resulting from one or more object deletions. Methods for reducing or increasing the playback speed while maintaining pitch, so as to minimize the resulting perceived distortion, are known in the art.

As noted above, deletion of particular media objects from the stream is based either on one or more user preferences associated with those objects, or in response to direct user action to delete a particular object during playback. Consequently, with respect to the user preferences, it is preferable to identify corresponding media objects prior to playback of the particular media objects so that those objects can be deleted prior to playback. Identification of such media objects is accomplished using any of a number of conventional techniques, such as, for example, conventional audio fingerprinting techniques, metadata analysis (assuming metadata is available in the stream), detection of repeating objects, etc.

Once a media object has been identified, either specifically, or by type (i.e., advertisement, station identifier, jingle, etc.) its identity (or type) is checked against a list of user preferences to determine whether particular media objects are to be deleted from the media stream. If an object is on the deletion list, either specifically, or by type, the endpoints of that object are determined, and it is simply deleted from the media stream. This process then continues for the period that the media stream is captured, buffered, and played back. Note that most conventional media object identification systems operate substantially faster than real-time. Consequently, this analysis of the media stream can quickly locate and delete unwanted objects from the buffered media stream to produce a "clean" media stream which is free of unwanted media objects.

However, one problem with simply deleting unwanted media objects from the buffered media stream to create the cleaned media stream is that with continued deletions, over time, the buffer will simply run empty, assuming an initial finite buffer size. Therefore, as noted above, replacement media objects are chosen for insertion back into the cleaned buffered media stream to replenish the buffer when necessary. Further, as noted above, the playback rate of the buffered content can also be reduced below the rate at which the buffer is filling from the incoming media stream by using pitch preserving audio stretching techniques. This allows the buffer to slowly regenerate over time to compensate for deletions of the media stream. Conversely, in a related embodiment, the playback rate of the buffered content is increased above the rate at which the buffer is filling from the incoming media stream by using pitch preserving audio compression techniques. This allows the buffer to slowly shrink over time to compensate for insertions of media objects into the media stream that are larger than any corresponding deletions from the media stream. In addition, as noted above, each of these methods, object insertion, audio stretching, and audio compression, are combined to create a hybrid embodiment which provides the features and advantages of all three techniques.

In one embodiment, a replacement media object is simply inserted into the media stream each time an existing media object is deleted from the media stream. However, most objects in a typical media stream, such as, for example, a conventional radio broadcast, a streaming media broadcast over a network such as the Internet, a television broadcast, etc., have different lengths. Consequently, simply replacing every deleted object with a new object can potentially eventually result in either an empty buffer, or conversely, a buffer which becomes too full.

Therefore, in a related embodiment, rather than simply providing a one-to-one replacement for every deleted object, the current size of the buffered media stream is continuously or periodically checked during playback. Then, whenever the buffer drops below a predetermined threshold level, one or more media objects are inserted back into the media stream to bring the buffer back up to at least the minimum threshold level, thereby maintaining an approximate buffer size over time. Again, it should be noted that stretching or compression of the buffered media stream may also be used to provide management of the level of the buffered media stream. When inserting objects, the objects are either inserted as a group of media objects between two existing media objects in the cleaned media stream, or as one or more groups of one or more media objects at various locations between existing media objects throughout the cleaned media stream. Note that in one embodiment, these insertions are made to fill the actual gaps where media objects were deleted from the stream. Alternately, the insertions are made between any two adjacent media objects in the media stream.

As noted above, the selection of media objects for insertion is based on a computed similarity to the media objects between which the replacement media objects are to be inserted. Therefore, rather than just compute the similarity between two media objects, it is important to identify media objects for insertion that are similar to the objects on both sides of the object to be inserted. In this manner, there will be a smooth transition between original and inserted media objects during playback of the buffered media stream. Consequently, when inserting multiple media objects between any two objects in the media stream, the system and method described herein can be considered to be a type of playlist generator which provides a series of media objects having a smooth transition from one to the next through the original and inserted media objects.

In general, any conventional technique which is capable of computing a similarity between media objects can be used by the media stream customizer for customizing buffered media streams in the manner described herein.

For example, many music type media streams provide embedded metadata which indicates artist, title, genre, etc. of the music being streamed. Consequently, in the simplest case, this metadata is used to select one or more matching songs, based on artist, genre, style, etc., for insertion between any two songs in the cleaned media stream to replenish the buffered media stream. For example, assuming that a genre of Song A and adjacent Song B within the cleaned media stream is provided by metadata embedded within the media stream, Song A' having the same genre as both Song A and Song B can be inserted between Song A and Song B in the buffered media stream to account for media objects deleted either from between Song A and Song B, or from elsewhere in the media stream.

Clearly, not all media streams include metadata. Further, even songs or other media objects within the same genre, or by the same artist, may be sufficiently different that simply using metadata alone to provide replacement selections can result in a media stream wherein the inserted objects produce apparent discontinuities in the media stream playback relative to a human listener. Consequently, in another embodiment, the actual content of the cleaned media stream is analyzed to characterize objects in the media stream. Complementary media objects are then selected for insertion into the media stream to replenish the buffer, as necessary.

For example, in the case of heavily beat oriented music, such as, for example, dance or techno type music, one commonly used technique for providing similar music is to compute a beats-per-minute (BPM) count of media objects and then find other media objects that have a similar BPM count. Such techniques can be used by the media stream customizer to select songs for insertion into the media stream to maintain buffer levels.

Another conventional technique for inferring or computing audio similarity includes computing similarity measures based on statistical characteristics of temporal and spectral features of one or more frames of an audio signal. The computed statistics are then used to describe the properties of a particular audio clip or media object. Similar objects are then identified by comparing the statistical properties of two or more media objects to find media objects having matching or similar statistical properties. Yet another conventional method for inferring or computing audio similarity includes the use of Mel Frequency Cepstral Coefficients (MFCCs) for modeling music spectra. Some of these methods then correlate Mel-spectral vectors to identify similar media objects having similar audio characteristics. Once such conventional technique is described in a publication entitled "*Content-based Retrieval of Music and Audio,*" in *Multimedia Storage and Archiving Systems II*, Proc. SPIE, Vol. 3229, pp. 138-147, (1997), by J. T. Foote, the subject matter of which is incorporated herein by this reference.

When choosing media objects for insertion, the only media objects that can be inserted are those that are available to the user's computer system. Typically, this means that the media objects to be inserted are chosen from a library of media objects available on the user's computer or that are available via a network connection having sufficient bandwidth to maintain the buffered media stream, or from some combination thereof. Further, since the media objects in the buffered media stream are being continuously identified, either specifically, or as unknown repeating objects, in one embodiment, media objects are simply extracted from the media stream on an ongoing basis and stored to the library of available media objects. Consequently, with this embodiment, over time, the library of media objects available for insertion into the media stream will become increasingly populated. These media objects can then be selected from the object library for reinsertion into the buffered media stream, as necessary, based on the aforementioned similarity analysis and comparison.

In addition to the just described benefits, other advantages of the media stream customizer will become apparent from the detailed description which follows hereinafter when taken in conjunction with the accompanying drawing figures.

DESCRIPTION OF THE DRAWINGS

The specific features, aspects, and advantages of the media stream customizer will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
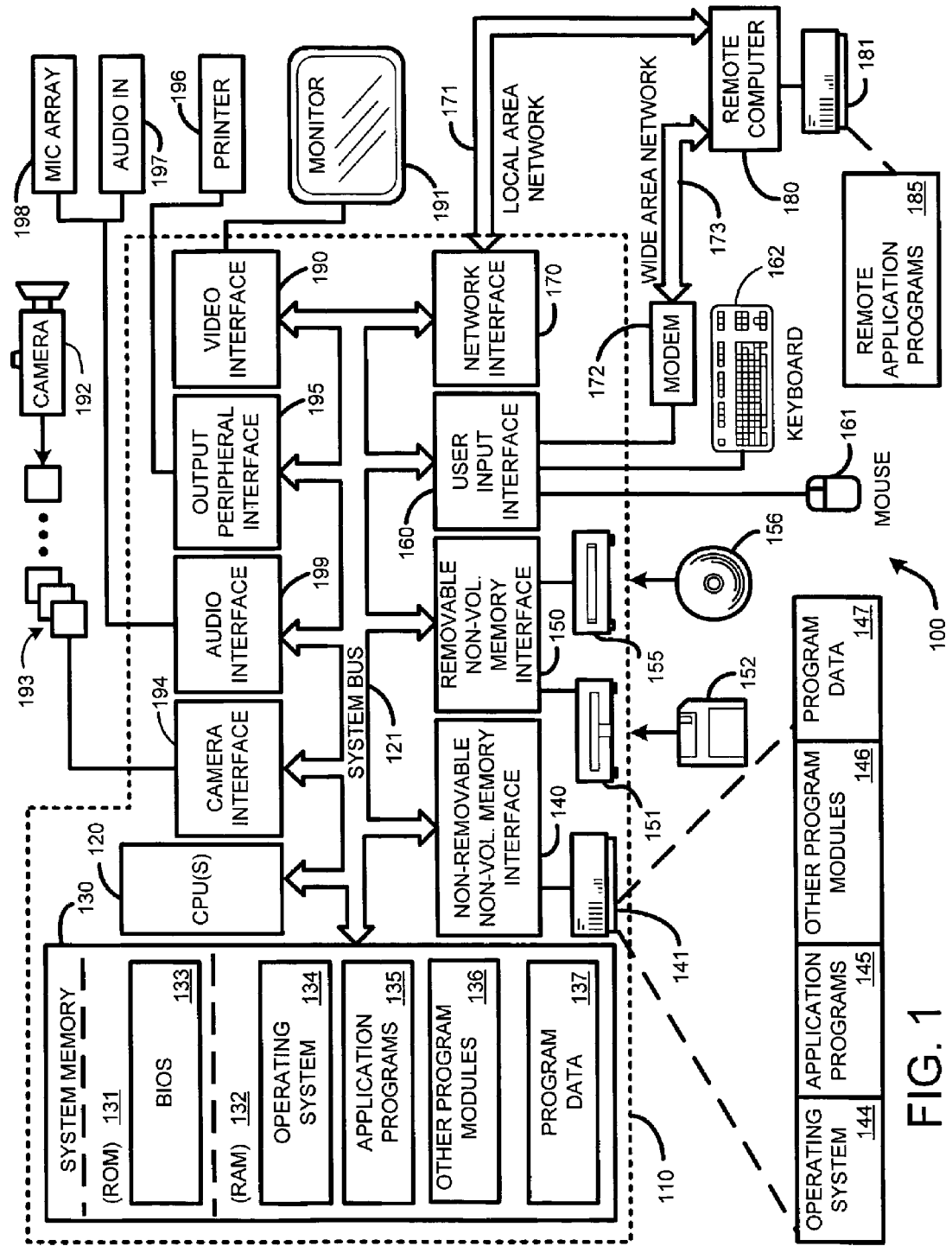
FIG. 1 is a general system diagram depicting a general-purpose computing device constituting an exemplary system for automatically customizing a buffered media stream by inserting media objects into a cleaned media stream based on computed media object similarities to maintain media stream buffer levels.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver/tuner, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, or other audio input device, such as, for example, a radio tuner or other audio input 197 connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional interfaces, including, for example, USB, IEEE 1394, Bluetooth™, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically customizing a buffered media stream.

2.0 Introduction:

A "media stream customizer," as described herein, operates to automatically customize a buffered media stream from which objects are being deleted. In general, as media objects, including, for example, songs, jingles, advertisements, or station identifiers are deleted from the buffered media stream, the amount of the incoming media stream being buffered will naturally decrease with each deletion. Therefore, over time, as more objects are deleted, the amount of the media stream currently maintained in the buffer continues to decrease, thereby limiting the ability to perform additional deletions from the stream during playback. To address this limitation, in one embodiment, the media stream customizer automatically analyzes the media stream, and a library of media objects (either preexisting or generated from the stream itself) and chooses one or more media objects to insert back into the stream in such a way as to minimize any perceivable discontinuities in the overall theme or mood of the buffered media stream when presented to a human listener.

In additional embodiments, pitch preserving audio stretching and compression techniques are used either alone, or in combination with media object insertion to provide a greater degree of control of the current buffer level. For example, pitch preserving audio stretching applied to playback of the buffered media stream will act to increase the size of the current buffer, as the buffer output will have a lower rate than the buffer input. This embodiment is useful for handling short gaps that cannot be filled with locally available content. For example, if a jingle or station identifier is removed from a stream containing just the spoken news, it is likely that the user will not own media content that can be inserted into the stream without damaging the perceived continuity. However, effectively eliminating the buffer deficit resulting from such deletions is easily accomplished over time by simply stretching playback of the buffered media stream.

2.1 System Overview:

As described herein, customization of the media stream is accomplished by inserting media objects into a media stream based on user specified preferences, so as to compensate for ongoing deletions of media objects from the buffered media stream. Further, the selection of objects for insertion is based on a similarity analysis which ensures that the inserted media objects are consistent with any surrounding content of the media stream. Additionally, audio stretching and compression techniques are used in alternate embodiments to provide a additional level of control over the current buffer size, so as to maintain the current buffer level at or near some desired buffer size. Note that pitch preserving audio stretching and compression techniques are well known to those skilled in the art, and will not be described herein.

Deletions from the media stream are generally based on a user specified preference as to those objects. The user preferences associated with particular objects are generally stored in either an object database or list, or in a fingerprint database, along with object fingerprints, depending upon the embodiment that is being used to identify media objects within the media stream. Further, in one embodiment, the database or list is accessible via a user interface to allow the user to add, edit, or remove entries in the list or database.

Particular media objects marked for deletion in the list or database are removed from the media stream prior to playback of those particular media objects. Therefore, those objects first need to be identified prior to playback of those objects. Identification of such media objects is accomplished using any of a number of conventional techniques, such as, for example, conventional audio fingerprinting techniques, metadata analysis (assuming metadata is available in the stream), detection of repeating objects, etc.

Once a media object has been identified, either specifically, or by type (i.e., advertisement, station identifier, jingle, etc.) its identity (or type) is checked against the aforementioned list or database of objects to be deleted from the media stream. If an object is on the deletion list, either specifically, or by type, the endpoints of that object are determined, and it is simply deleted from the media stream. This process then continues for the period that the media stream is captured, buffered, and played back. Note that most conventional media object identification systems operate substantially faster than real-time. Consequently, this analysis of the media stream can quickly locate and delete unwanted objects from the buffered media stream to produce a "clean" media stream which is free of unwanted media objects.

For example, where a user has specified a particular media object as one that should never be played (whether or not it has ever appeared previously in the buffered media stream), then that media object will be automatically deleted from the media stream whenever it is identified within the buffered media stream. Similarly, where the user has specified that any media object fitting the generic profile of a particular object type, such as a commercial, advertisement, or station identifier, or station jingle, should never be played, media objects fitting such generic profiles will simply be eliminated from the media stream. Further, in one embodiment, the user can also identify particular media objects, or types of media objects as being objects that should be played with reduced frequency when they occur within the media stream. Consequently, such media objects will be deleted from the media stream with a frequency corresponding to the user's preferences with respect to those media objects.

In addition, media objects can also be deleted during playback of those media objects by direct user action. For example, in one embodiment, a user interface is provided for directing the system to skip or delete the currently playing media object. In this case, playback of the buffered media stream will continue from the immediately succeeding media object already in the stream, and the buffer will be replenished, as necessary, by adding one or more additional objects at other future locations within the media stream, or by stretching the playback of the buffered content.

Further, as noted above, the media stream is at least partially buffered, and the media stream customizer performs an ongoing identification of the buffered media objects as the incoming media stream is buffered. Consequently, in one embodiment, the user is provided with the capability to browse through the list of upcoming identified objects in the currently buffered media stream during playback. The user can then use the identification information to direct the system to delete or skip particular buffered objects prior to playback of those objects.

In one embodiment a replacement media object is simply inserted into the media stream each time an existing media object is deleted from the media stream. However, most media objects in a typical media stream, such as, for example, a conventional radio broadcast, a streaming media broadcast over a network such as the Internet, a television broadcast, etc., have different lengths. Consequently, simply replacing every deleted object with a new object can potentially eventually result in either an empty buffer, or conversely, a buffer which becomes too full.

Therefore, in a related embodiment, rather than simply providing a one-to-one replacement for every deleted object, the current size of the buffered media stream is periodically checked during playback. Then, whenever the buffer drops below a predetermined threshold, the buffer playback is either stretched, or one or more media objects are inserted back into the buffered media stream to bring the buffer up to at least some minimum threshold level, thereby maintaining an approximate buffer size over time. These objects are either inserted as a group of one or more media objects between two existing media objects in the cleaned media stream, or as one or more groups of one or more media objects at various locations between existing media objects throughout the cleaned media stream. Note that in one embodiment, these insertions are made to fill the actual gaps where media objects have been deleted from the stream. Alternately, the insertions are made between any two adjacent media objects in the media stream, depending upon the aforementioned similarity analysis.

As noted above, in one embodiment, playback of the buffered media stream is done slower than real time (audio stretching), which permits the buffer to fill up slightly faster than it is drained by the playback. Such slowdown only occurs when the buffer is not full, or when it is desired to eliminate relatively small gaps in the buffer resulting from deletions of relatively short objects, such as, for example, station identifiers, jingles, or relatively short commercials or advertisements. This slowdown can preserve the pitch of the audio of the media (including combined audio/video media streams), as is well known to those skilled in the art. Further, where the gaps in the buffer are sufficiently large, the playback slowdown can also be combined with media object insertions, as described above. Similarly, media object insertions can be combined with a pitch preserving playback of the buffered media stream.

In other cases, either where, although the gaps in the buffer may be large, the rate at which media is deleted from the stream is sufficiently small, or where the gaps themselves are sufficiently small, the slowdown method can be used to allow the buffer to gradually fill back up. In addition, the slowdown method can leverage a pitch-preserving speedup that radio stations often apply to their broadcast material. Specifically, a radio station will often apply a 2% (or more) pitch-preserving speedup to the songs that they broadcast. On advantage of this technique for the radio stations is that it serves to generate more time during the day in which to air commercials. Thus, for those kinds of streams, the playback slowdown embodiments described herein can apply a 2% decrease in speed and actually present the audio content to the user at a tempo that is closer to the original, uncompressed, content. Further, given the pre-compressed nature of such media streams applying a 4% decrease in playback speed (equivalent to a 4% stretching of the buffered media stream), will only result in a 2% decrease in the tempo of the original recording. In either case the resulting gain the in buffer size can be used to remove gaps produced by the deletion of objects in the stream. Stretching and compression of audio signals by such relatively small percentages is typically either not noticeable or not objectionable to most listeners.

As noted above, the selection of objects for insertion, and the insertion point within the buffered media stream, is based on the similarity analysis between objects surrounding the insertion point, and objects in a library of media objects (either preexisting or generated from the stream itself). This similarity analysis identifies a set of one or more candidate media objects that are similar to the objects on both sides of the position within the media stream where the replacement media objects are to be inserted.

The best, or most similar, object or objects are then chosen for insertion into the buffered media stream so as to minimize or eliminate any perceived discontinuities in the theme or mood of the buffered media stream when presented to a human listener during playback. In this manner, there will be a smooth transition between original and inserted media objects during playback of the buffered media stream. In general, any conventional technique which is capable of computing the similarity between media objects can be used by the media stream customizer for customizing buffered media streams in the manner described herein.

However, in another embodiment, rather than using conventional similarity analysis techniques, a unique method for inferring similarity between any two pieces of music is used. In general, this method generates similarity-based music playlists using a subset of music similarity vectors generated from a music similarity graph. This technique takes a set of music similarities (expressed as a graph with weighted links) and assigns each musical item a coordinate vector. Euclidean distance between any two coordinate vectors is then computed and used to approximate how similar the two items are.

When choosing media objects for insertion, the only media objects that can be inserted are those that are available to the user's computer system. Typically, this means that the media objects to be inserted are chosen from a library of media objects available on the user's computer or that are available via a network connection having sufficient bandwidth to maintain the buffered media stream, or from some combination thereof. Further, since the media objects in the buffered media stream are being continuously identified, either specifically, or as unknown repeating objects, in one embodiment, one or more media objects are simply extracted from the media stream on an ongoing basis and stored to the library of available media objects. Consequently, with this embodiment, over time, the library of media objects available for insertion into the media stream will become increasingly populated.

Figure 2:
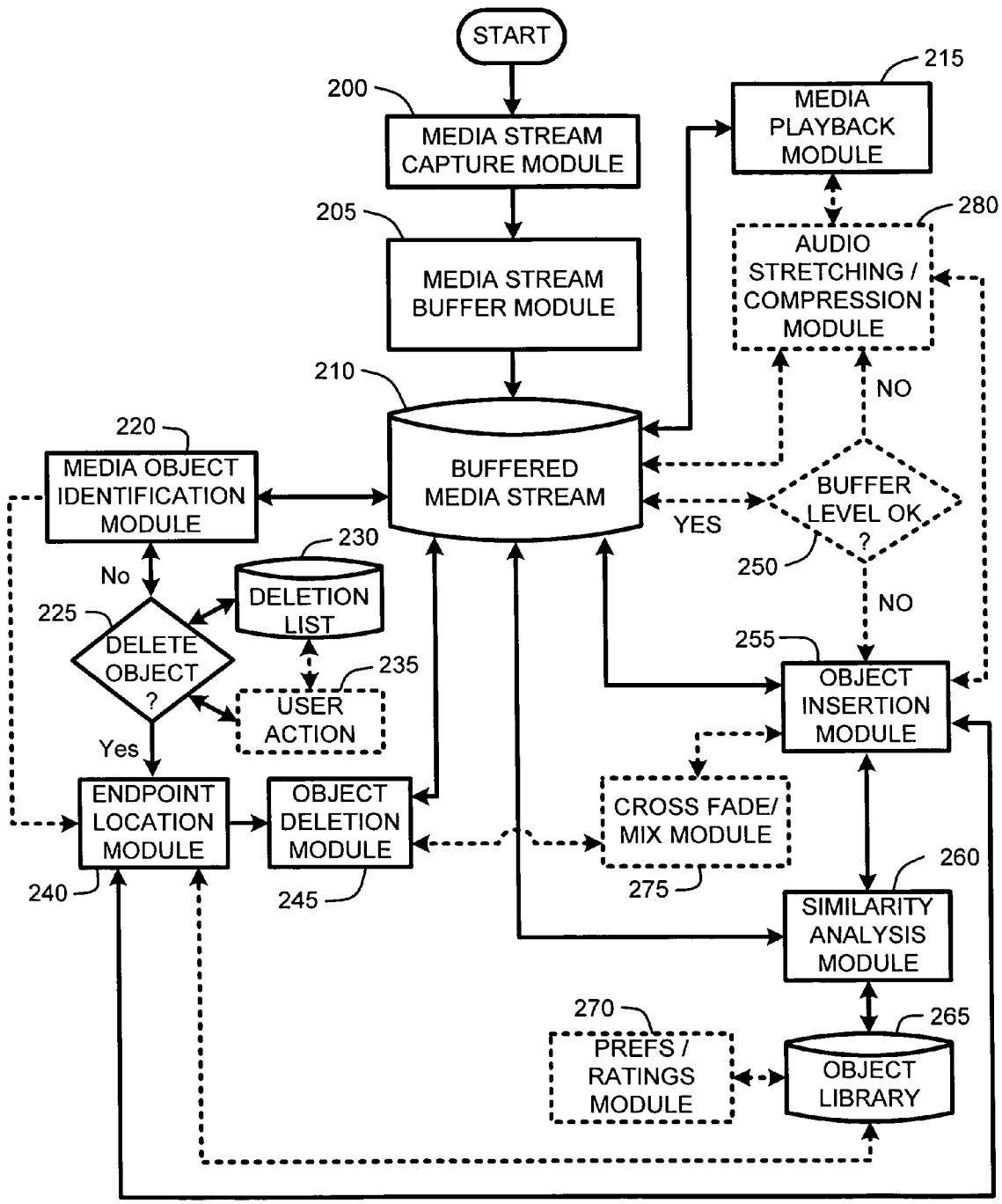
FIG. 2 illustrates an exemplary architectural diagram showing exemplary program modules for automatically customizing a buffered media stream, as described herein.

2.2 System Architecture:

The following discussion illustrates the processes summarized above for providing automatic customization of media streams with respect to the architectural flow diagram of FIG. 2. In particular, the architectural flow diagram of FIG. 2 illustrates the interrelationships between program modules for implementing the media stream customizer for customizing buffered media streams in the manner described herein. It should be noted that the boxes and interconnections between boxes that are represented by broken or dashed lines in FIG. 2 represent alternate embodiments of the media stream customizer, and that any or all of these alternate embodiments, as described herein, may be used in combination with other alternate embodiments that are described throughout this document.

In general, as illustrated by FIG. 2, the system and method described herein for providing automatic customization of buffered media streams operates by automatically choosing one or more media objects to insert back into the stream to compensate for deletions of media objects from the buffered media stream. Selection of objects for insertion is based on a similarity analysis which ensures that the inserted media objects are consistent with any surrounding content of the media stream. Alternately, the system and method described herein for providing automatic customization of buffered media streams operates by automatically stretching some or all of the buffered content during playback of that content to provide an additional degree of control over the current buffer level as a function of time.

Operation of the media stream customizer begins by using a media stream capture module 200 for capturing a media stream containing audio information from any conventional media stream source, including, for example, radio broadcasts, network or Internet broadcasts, television broadcasts, etc. The media stream capture module 200 uses any of a number of conventional techniques to capture this media stream. Such media stream capture techniques are well known to those skilled in the art, and will not be described herein.

As the incoming media stream is captured, a media stream buffer module 205 buffers the incoming media stream in a computer file, database, or memory 210. Once a sufficient amount of the incoming media stream has been buffered, the buffered media stream 210 is provided to a media playback module 215 which begins and continues playback of the buffered media stream using conventional playback devices (audio decoders, speaker systems, etc.).

However, rather than merely buffer the media stream and provide it for playback, as the media stream is being buffered, the buffered media stream 210 is also being analyzed by a media object identification module 220. The media object identification module 220 operates to identify media objects occurring in the media stream using conventional object identification techniques (fingerprints, metadata, etc.), as discussed in further detail below in Section 3.1. Further, regardless of which media object identification technique is employed to identify media objects within the buffered media stream 210, once identified, a determination is made as to whether the object is to be deleted 225. This determination 225 is made by simply comparing each identified object to a deletion list 230 which contains an identification of specific media objects, or of general media object types or classes, which are to be deleted from the buffered media stream 210.

If the media object is not in the deletion list 230, the media object identification module 220 then proceeds to identify the next media object in the stream and then to check that newly identified object against the list, as described above. Further, as noted above, in one embodiment, a user interface 235 is provided to allow the user to edit or update the deletion list 230, or to manually order the deletion of particular media objects, either prior to or during playback of those objects.

As soon as an identified media object or general object class matches an entry in the deletion list 230, or whenever the user orders deletion of a particular object with the user interface, an endpoint location module 240 is used to compute the endpoints of the media object to be deleted. As with the initial identification of the media objects or object classes by the media object identification module 220, identification of the endpoints of those objects also uses conventional endpoint isolation techniques. There are many such techniques that are well known to those skilled in the art. Consequently, these endpoint location techniques will be only generally discussed herein.

Note that in one embodiment, rather than determining object endpoints only when objects are to be deleted, the endpoint location module 240 instead computes the endpoints for every media object identified by the media object identification module 220. One advantage of this embodiment is that media objects can then be copied from the buffered media stream 210 and saved to an object library 265 along with the identification information corresponding to each copied object. Such objects are then available for later use or playback by the user, and also for use as replacement objects in replenishing the buffered media stream 210 through object insertions, as necessary.

Next, assuming that a particular media object is to be deleted from the buffered media stream 210, the endpoint information isolated by the endpoint location module 240 for that object is provided to an object deletion module 245. Given the endpoint information, it is a simple matter for the object deletion module to simply delete the portion of the buffered media stream 210 that is bounded by the identified endpoints.

Further, in one embodiment, a cross fade/mix module 275 is then used to cross fade or mix (i.e., "blend") the ends of the media stream bordering the section that was deleted from the buffered media stream. One advantage of this embodiment is that like many conventional radio broadcasts, media objects such as music or songs will more smoothly transition from one to the next. Further, another advantage of this embodiment is that small errors in endpoint determination for deleted media objects are better hidden from a human listener by the use of conventional cross fading or mixing techniques to rejoin the sections of the buffered media stream around the deleted media object.

Media stream capture and buffering, and identification and deletion of objects within the buffered media stream 210, continues as described above for the duration of the playback of the buffered media stream. However, in parallel with these operations, the buffer is periodically or continuously being replenished, either via object insertions, or by stretching of some or all of the buffered content of the media stream during playback, so as to account for the media object deletions.

Media object insertion for replenishing the buffered media stream is made by an object insertion module 255. In operation, the object insertion module 255 simply inserts one or more media objects between two existing objects in the buffered media stream 210. As noted above, in one embodiment, the insertion of a media object into the buffered media stream 210 is performed every time that a media object is deleted from the buffered media stream.

Alternately, in a related embodiment, a check of the current buffer level is continuously or periodically performed 250. Then, whenever the buffer level runs below some predefined minimum threshold, which is typically dependent upon the total buffer length, the object insertion module 255 is directed to insert a media object back into the buffered media stream 210 to replenish the shrinking buffer. Alternately, an audio stretching/compression module 280 is used to stretch the playback of the buffered content, as described in further detail below. It should be noted that both of these embodiments are also useful for addressing the temporary loss of the incoming media stream. For example, where the buffered media stream 210 is being captured from a live radio broadcast, if the radio station temporarily goes offline, the buffer level will begin to drop during playback even without deletions of media objects. However, by checking the buffer level 250 and directing the object insertion module to replenish the buffer as necessary, or the audio stretching/compression module 280 to stretch the playback of the buffered content, the user will not be aware of the temporary loss of the incoming media stream.

In one embodiment, each insertion is made at point where a media object has already been deleted. One advantage of this embodiment is that it is not necessary to identify any object endpoints beyond the endpoints of the media objects that have been deleted, since the end and beginning of the media objects immediately preceding and succeeding the deleted object are naturally coincident with the endpoints of the deleted object. In other words, the immediately preceding media object naturally ends where the deleted object began, and the immediately succeeding media object naturally begins where the deleted object ended. Consequently, less computational effort is required to determine exact endpoints for object insertion locations. However, in one embodiment, the media stream customizer is fully capable of inserting one or more replacement media objects between any two adjacent media objects in the buffered media stream once the endpoints delimiting any two adjacent objects within the media stream have been identified by the endpoint location module 240.

Further, when inserting media objects into the media stream, the cross fade/mix module 275 can again be used, in the manner described above, to seamlessly mix the inserted songs into the buffered media stream 210.

As noted above, in one embodiment, the buffered media stream provided to the media playback module 215 is first processed by an audio stretching/compression module 280. The audio stretching/compression module 280 operates to either compress or stretch any audio component of the media stream such that system plays back the media either slower or faster than real time, while maintaining the pitch of the audio in the media. As noted above, techniques for audio pitch-preserving media playback speedup and slowdown are well known in the art. (Note that in a combined audio video stream, the frame rate of corresponding video is simply increased or decreased to match the compressed or stretched audio playback of the media stream). Clearly, stretching the audio playback permits the media stream buffer module 205 to fill the buffer somewhat faster than the media playback module 215 drains it. Similarly, compressing the audio playback permits the media stream buffer 210 to be drained by the media playback module 215 somewhat faster than the media stream buffer module 205 fills the buffer. However, as noted above, the playback rate of an audio stream can only be slowed down, or speeded up, by a few percent before a user notices it.

The slowdown or speedup of the audio component of the buffered media stream 210 by the audio stretching/compression module 280 is best used in two particular embodiments. In the first embodiment, the audio stretching/compression module 280 is used in combination with the object insertion module 255 to slowly fill the buffer back up, or to slowly drain it if the buffer becomes too full. In the second embodiment, the slowdown module is used alone, again to slowly allow the buffer to fill back up, or to slowly drain.

The second embodiment noted above is most appropriate when no media objects are available to fill in the gaps resulting from deletions of objects from the buffered media stream 210, and can be used even if large gaps are present in the buffer, provided that the rate at which new gaps are added (as a result of deletions) is small enough. The second embodiment can also be used when the introduced gaps are small (for example, when a jingle or station identifier is removed). Further, there may be times when the second embodiment is preferable no matter how large the media collection of the user is: for example, if the user is listening to talk radio, then inserting any song may be unacceptably disruptive. In this case, deletions from the buffer may be temporarily suspended if the buffer runs too low, while the playback is being stretched to gradually replenish the buffer 210. In addition, it should be noted that in one embodiment, compressing or stretching of the buffered media stream 210 is applied to the portion of the buffered content 210 being currently provided for playback by the media playback module 215, rather than directly to the entire buffer contents.

As noted above, the object insertion module 255 simply inserts one or more media objects into the buffered media stream, either with, or without, the use of the cross fade/mix module 275. However, the object insertion module 255 does not itself decide either where in the buffered media stream 210 to insert media objects, or which object or objects to insert into the buffered media stream. In fact, as noted above, the primary criteria for inserting media objects into the media stream is that the inserted media objects are sufficiently similar to the media objects between which they are to be inserted.

Consequently, to address this issue, a similarity analysis module 260 is used to perform two tasks. First, the similarity analysis module 260 picks two adjacent media objects in the media stream, which may or may not border a deleted media object. The similarity analysis module 260 then analyzes the selected media objects to characterize those media objects.

As noted above, in addition to the aforementioned music similarity vector-based technique, the media stream customizer is also capable of using conventional music similarity analysis techniques. For example, if metadata is available in the media stream, then the characterization can be based on that metadata. Alternately, other conventional media characterization means, as discussed herein, can also be used to characterize any two adjacent media objects within the media stream.

Next, once two adjacent media objects have been characterized, the similarity analysis module 260 then searches through the aforementioned object library 265 for a replacement media object or objects that are sufficiently similar to two media objects characterized in the buffered media stream 210, within some predefined similarity threshold. If no media object within the object library 265 is sufficiently similar to the two adjacent media objects characterized in the buffered media stream, the similarity analysis module 260 simply picks another two adjacent media objects in the buffered media stream, and looks for one or more media objects in the object library 265 that are sufficiently similar to be placed between those two media objects. Alternately, as noted above, stretching of the buffered content by the audio stretching/compression module 280 may be used in combination with, or in place of, media object insertions.

Further, as noted above, in one embodiment, more than one media object is inserted into the buffered media stream 210 between any two adjacent media objects in that media stream. In this embodiment, rather than matching each inserted media object to the existing media objects surrounding the inserted objects a better solution is to instead generate a playlist or sequence of media objects that will smoothly transition from the starting media object in the existing stream, and through the inserted objects to the ending media object in the existing media stream.

In other words, to insert media objects between adjacent objects A and E in the buffered media stream 210, it is necessary to select a set of media objects B, C, and D such that the transition from A to B to C to D and finally to E is a smooth transition, in terms of object similarity. Consequently, in this sense, it is not absolutely necessary that object B is similar, for example, to object E, so long as it is sufficiently similar to objects A and C such that the transition from one object to the next is smooth, relative to object similarity, and that the overall mood or theme of the transition from object A through object E is smooth, again relative to object similarity. This concept is described in further detail below in Section 3.2.

Further, in one embodiment, media objects in the object library 265 are weighted or rated via a preferences/ratings module 270. In particular, in this embodiment, a user interface is provided for weighting media objects in the object library, to either increase or decrease the weight of those objects. Those objects will then be chosen with either more, or less, frequency when selecting similar media objects for insertion into the media stream, depending upon the weight or rating assigned to particular media objects. Further, in a related embodiment, ratings or weightings of particular media objects is automatically inferred based on user behavior. For example, if a user plays a particular media object many times more than other media objects in the library, a higher weight will be automatically assigned to that media object. Conversely, if the user plays a particular media object very rarely, or never at all, that object will be assigned a lower rating or weight by the preferences/ratings module 270.

3.0 Operation Overview:

The above-described program modules are employed in a media stream customizer for providing automatic customization and replenishment from a media stream from which objects are being deleted. The following sections provide a detailed operational discussion of exemplary methods for implementing the aforementioned program modules with reference to the operational flow diagram of FIG. 3, as discussed below in Section 3.4.

3.1 Media Object Identification:

As noted above, media object identification is performed using any of a number of conventional techniques. For example, conventional techniques for identifying media objects include, but are not limited to conventional audio fingerprint analysis techniques which generally compare audio signatures or parametric information derived from portions of the media stream to parametric in a database of known audio fingerprints to locate matches.

Other methods for identifying media objects in a media stream rely on an analysis of parametric information to locate particular types or classes of objects within the media stream without necessarily specifically identifying those media objects. Such techniques are useful for identifying classes of media objects such as commercials or advertisements. For example commercials or advertisements in a media stream tend to repeat frequently in many broadcast media streams, tend to be from 15 to 45 seconds in length, and tend to be grouped in blocks of 3 to 5 minutes. Techniques for using such information to generally identify one or more media object as simply belonging to a particular class of objects (without providing a specific identification of each individual object) are well known to those skilled in the art, and will not be described in further detail herein.

Still another conventional method used for identifying media objects within the buffered media stream includes an identification of repeat instances of media objects without necessarily specifically identifying those repeating objects by name. For example, as described in U.S. Pat. No. 6,766,523, entitled "System and Method for Identifying and Segmenting Repeating Media Objects Embedded in a Stream," by Cormac Herley, the subject matter of which is incorporated herein by this reference, an "object extractor" automatically identifies repeat instances of potentially unknown media objects such as, for example, a song, advertisement, jingle, etc., and segments those repeating media objects from the media stream.

Using this technique, identification and segmentation of the repeating objects is then achieved by directly comparing sections of the media stream to identify matching portions of the stream, and then aligning the matching portions to identify object endpoints. Then, whenever an object repeats in the media stream, it is identified as a repeating object, even if its actual identity is not known. If a user has specified a deletion preference as to that repeating object, such as, for example, delete once, delete always, delete with some weighted frequency, etc., that deletion preference will be acted on whenever that object repeats in the buffered media stream. This embodiment is particularly useful for deleting objects such as advertisements, station jingles, commercials, etc., since such objects tend to be significantly shorter in length, and tend to repeat more often, than other objects in the stream. Consequently, such objects are therefore easier to identify as a class or group, even if the actual identity of the individual objects remains unknown.

3.2 Media Similarity Analysis and Selection of Objects for Insertion:

As noted above, media objects chosen for insertion to replenish the buffered media stream are selected based on their similarity to objects surrounding the insertion point of those objects.

For example, in one embodiment, a unique method for inferring similarity between any two pieces of music is used. In general, this method generates similarity-based music playlists by using a subset of music similarity vectors generated from a music similarity graph. This technique takes a set of music similarities (expressed as a graph with weighted links) and assigns each musical item a coordinate vector. Euclidean distance between any two coordinate vectors is then computed and used to approximate how similar the two items are.

However, rather than requiring each client computer to generate the music similarity table, this process is instead performed by one or more master or global servers. In general, the global server (or servers) is first used to generate the similarity graph from all available music. Note that since this process is performed offline, the music similarity graph can potentially include millions of music entries. Further, as new music becomes available, the global server simply updates the music similarity graph to include the new entries.

The global server then uses a recursive embedding algorithm to embed each of the individual music entries represented in the similarity graph into a multidimensional space. Given this embedding, coordinate vectors are then computed for each of the embedded musical items. The coordinate vectors are then stored to a global similarity table. The similarity between any two musical items is then simply determined as a function of the Euclidean distance between those two vectors. Consequently, each local client needs only have a subset of the entire table of coordinate vectors, corresponding to the music that the user currently has access to. This is much smaller than the original graph of musical similarity. Therefore, each client simply sends a list of the music available to the client to the global server, and receives a set of the coordinate vectors corresponding to that music in return.

Consequently, whenever it is desired to generate a playlist for inserting one or more songs between any two or more songs in the buffered media stream, the coordinate vectors corresponding to the songs in the media stream between which the insertion is to be made are retrieved from the global server. These retrieved coordinate vectors are then compared to the coordinate vectors of the music available for insertion, and the playlist is generated based on the Euclidean distance between the coordinate vectors.

It should be noted that the vector-based similarity analysis techniques summarized above are described in greater detail in a copending patent application entitled "A system and Method for Constructing a Table of Music Similarity Vectors from a Music Similarity Graph," having a filing date of TBD, and assigned Serial Number TBD, the subject matter of which is incorporated herein by this reference.

In addition to the aforementioned similarity analysis techniques, any of a number of conventional similarity analysis techniques can also be used for this purpose. For example, many music type media streams provide embedded metadata which indicates artist, title, genre, etc. of the music being streamed. Consequently, in the simplest case, this metadata is used to select one or more matching songs for insertion between any two songs in the cleaned media stream to replenish the buffered media stream. For example, assuming that a genre of Song A and adjacent Song B within the cleaned media stream is provided by metadata embedded within the media stream, Song A' having the same genre as both Song A and Song B can be inserted between Song A and Song B in the buffered media stream to account for media objects deleted either from between Song A and Song B, or from elsewhere in the media stream.

Clearly, not all media streams include metadata. Further, even songs or other media objects within the same genre, or by the same artist, may be sufficiently different that simply using metadata alone to provide replacement selections can result in a media stream wherein the inserted objects produce apparent discontinuities in the media stream playback relative to a human listener. Consequently, in another embodiment, the actual content of the cleaned media stream is analyzed to characterize the objects in the media stream. Complementary media objects are then selected for insertion into the media stream to replenish the buffer, as necessary.

For example, in the case of heavily beat oriented music, such as, for example, dance or techno type music, one commonly used technique is to compute a beats-per-minute (BPM) count of media objects and then find other media objects that have a similar BPM count. Such techniques can be used by the media stream customizer to select songs for insertion into the media stream to maintain buffer levels.

Another conventional technique for inferring or computing audio similarity includes computing similarity measures based on statistical characteristics of temporal and spectral features of one or more frames of an audio signal. The computed statistics, including mean, standard deviation or covariance, are then used to describe the properties of a particular audio clip or media object. Similar objects are then identified by comparing the statistical properties of two or more media objects to find media objects having matching or similar statistical properties. More complicated conventional methods for inferring or computing audio similarity include the use of Mel Frequency Cepstral Coefficients (MFCCs) for modeling music spectra. Some of these methods then correlate Mel-spectral vectors to identify similar media objects having similar audio characteristics.

Further, as described above, the similarity metrics can also be used for playlist generation when inserting multiple sequential media objects between any two or more seed objects in the buffered media stream. A number of conventional techniques exist for generating a playlist of intermediate objects from an object library for insertion between a starting seed object and an ending seed object. However, such techniques have not been adapted for use in real-time buffer management and customization operations, as described herein.

For example, one such conventional playlist generation technique is described in U.S. Patent Application Publication No. 20030221541, entitled "Auto Playlist Generation with Multiple Seed Songs," by John C. Platt, the subject matter of which is incorporated herein by this reference. In general, the playlist system and method described in the referenced patent application publication compares media objects in a collection or library of media objects with seed objects (i.e., the objects between which one or more media objects are to be inserted) and determines which media objects in the library are to be added into a playlist by computation and comparison of similarity metrics or values of the seed objects and objects within the library of media objects. This particular technique is useful for implementing the example provided above wherein it is desired to insert songs B, C, and D between adjacent Songs A and E in the buffered media stream.

In addition any other technique for calculating or inferring distances or similarities between media objects can be used as a criterion for generating music playlists for the media stream customizer. Clearly, the media stream customizer requires that neighboring objects in the buffer be similar, but that similarity can be derived in any of a number of different ways, as should be clear from the preceding discussion.

3.3 Media Stretching and Compression:

As noted above, the playback rate of the buffered media stream can be reduced below the rate at which the buffer is filling from the incoming media stream by using pitch preserving audio stretching techniques. This allows the buffer to slowly regenerate over time to compensate for deletions of the media stream. Conversely, in a related embodiment, the playback rate of the buffered content is increased above the rate at which the buffer is filling from the incoming media stream by using pitch preserving audio compression techniques. This allows the buffer to slowly shrink over time to compensate for insertions of media objects into the media stream that are larger than any corresponding deletions from the media stream. However, as noted above, the playback rate of an audio stream can only be slowed down, or speeded up, by a few percent before a user notices it. Consequently, any stretching or compression applied to the media stream playback is preferably limited to an amount on the order of around two to four percent of the nominal playback speed. Note that conventional pitch preserving audio compression and stretching techniques are well known to those skilled in the art, and will not be described in detail herein.

3.4 System Operation:

As noted above, the media stream customizer requires a process that provides for the identification of media objects (or media object types), and if they are to be deleted, a determination of their endpoint locations within the buffered media stream. Given these object identifications, objects are deleted from the media stream whenever identified. The buffered media stream is then replenished according to a similarity analysis between objects in the object library and the objects surrounding an insertion point in the buffered media stream. These concepts are further illustrated by the operational flow diagram of FIG. 3 which provides an overview of the operation of the media stream customizer.

Figure 3:
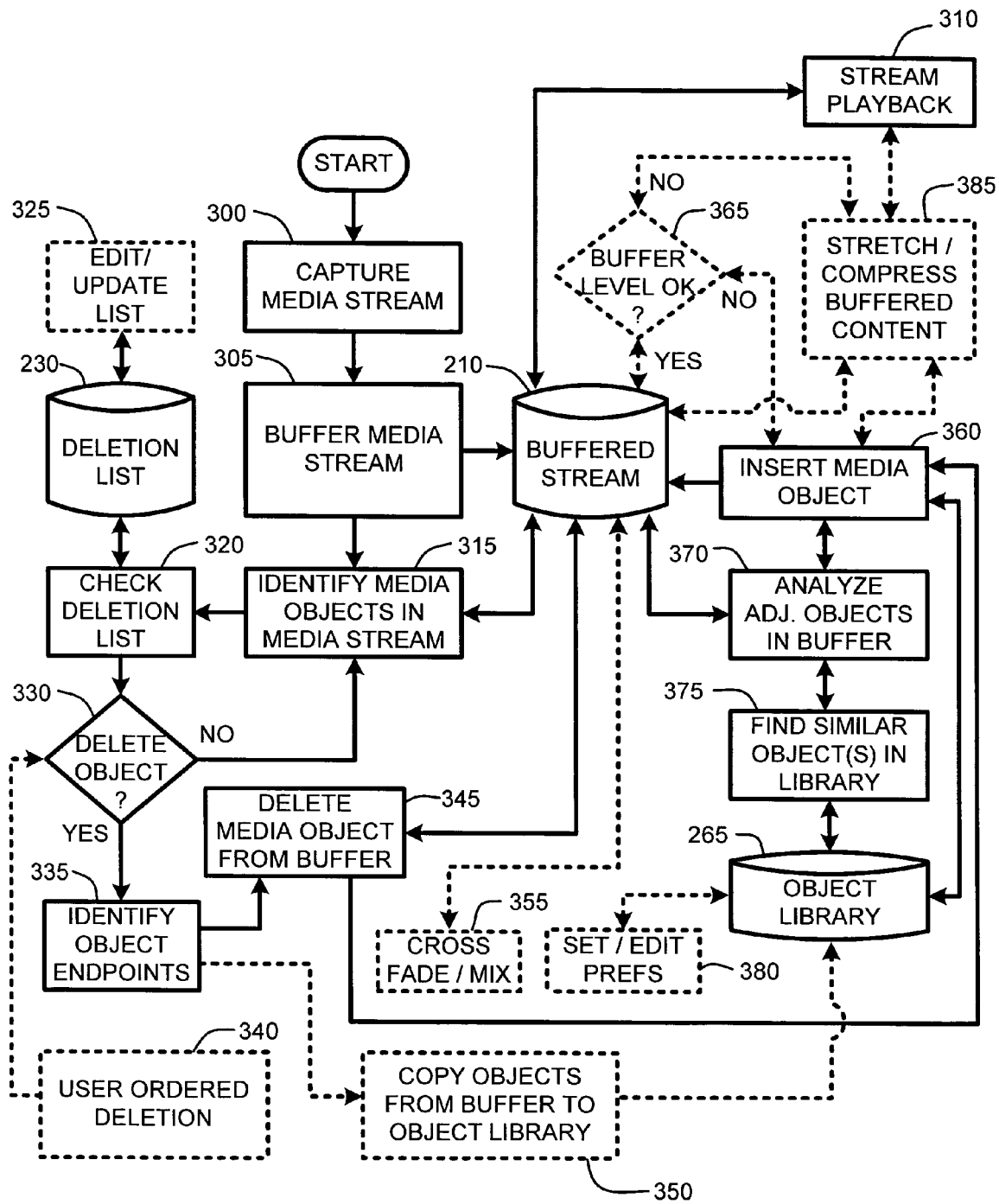
FIG. 3 illustrates an exemplary operational flow diagram for automatically customizing a buffered media stream, as described herein.

It should be noted that the boxes and interconnections between boxes that are represented by broken or dashed lines in FIG. 3 represent alternate embodiments of the media stream customizer, and that any or all of these alternate embodiments, as described herein, may be used in combination with other alternate embodiments that are described throughout this document.

Further, it should also be noted that that the following discussion makes reference to the detection of music or songs in an audio media stream in order to describe the media stream customizer in an operational context. However, as discussed above, the same generic approach described herein applies equally well to other classes of objects such as, for example, speech, station jingles, advertisements, mixed audio/video signals, etc.

In particular, as illustrated by FIG. 3, operation of the media stream customizer begins by capturing an incoming media stream 300 and buffering 305 that stream 210. As soon as buffering of the media stream begins, analysis of the buffered media stream 210 is begins for the purpose of identifying individual media objects 315 in the media stream, either specifically, or by generic type or class. In addition, once a sufficient amount of the media stream has been buffered 305, then the buffered media stream 210 is provided for real-time playback 310.

Once a media object has been identified 315, the deletion list 230 is checked 320 to determine whether the identified object is to be deleted from the buffered media stream. Further, as noted above, in one embodiment, a user interface is provided to enable the user to edit or update 325 the deletion list 230. If the identified object is in the deletion list, either specifically or by type, i.e., commercials, jingles, station identifiers, etc., then the object is set for deletion 330. Alternately, the user can directly order 340 the deletion of one or more media objects, either by ordering the object currently playing to be deleted, or by browsing a list up upcoming objects in the media stream. Note that such a list can be made available shortly after the buffering process begins, since the identification of media objects in the buffered media stream 210 is typically significantly faster than real-time.

In order to delete the object from the buffered media stream, it is necessary to first identify the object endpoints 335. Once these endpoints have been identified, as described above, then it is a simple matter to delete 345 the endpoint delimited media object from the buffered media stream 210. Further, since the media objects have already been identified, and since the capability exists to determine the endpoints of the objects in the media stream 210, in one embodiment, objects are also copied 350 from the buffered media stream to the object library 265. This embodiment is advantageous for several reasons. For example, the object library 265 will begin to be populated with additional objects, thereby providing a larger selection from which choose objects when replenishing the buffer. In addition, assuming that the user listens to the same or similar streams, it is likely that many of the objects extracted from the buffered media stream 210 will be fairly similar to the media being buffered, thereby allowing greater flexibility in choosing replacement objects based on the similarity analysis.

As noted above, in one embodiment, the gap where the media object was just deleted 345 is then filled by inserting a media object 360 from the object library 265 back into the buffered media stream 210. Alternately, one or more replacement media objects are inserted between any two adjacent media objects in the media stream. In another alternate embodiment, rather than just inserting a new object every time one is deleted, object insertions are performed as a function of buffer level. In this embodiment, the buffer level is periodically checked, and when it runs below some predetermined or user adjustable threshold, it is simply topped off by inserting one or more media objects, as described herein. Further, either in conjunction with, or as an alternative to media object insertions, stretching or compression 385 of the buffered media stream 210 is also provided by the media stream customizer.

Further, in one embodiment, the inserted media object or objects are cross faded or mixed 355 with the surrounding media objects to provide for a smoother transition from one media object to the next. Alternately, the buffered media stream surrounding deleted objects can also be cross-faded or mixed without the insertion of media objects in locations where object have been deleted from the buffered media stream. In addition, as discussed above in Section 3.2, inserting two or more media objects between any two adjacent objects in the buffered media stream 210 is similar to constructing a similarity-based playlist given a starting and ending seed object.

As discussed above, the selection of the media object or objects to be inserted 360 into the media stream from the object library 265 is based on a similarity analysis. The purpose of this similarity analysis is to minimize abrupt transitions in the theme or mood of the media stream during playback. For example, most listeners would likely consider any transition from a song such as "*I Got You Babe*" by Sonny and Cher, to a "heavy metal " song such as "*Enter Sandman*" by the band Metallica, to the song "*Mandy*" by Barry Manilow, to be a jarringly abrupt transition.

Consequently, when inserting 360 the media object into the buffered media stream, the adjacent media objects between which the new object is to be inserted are first analyzed 370 to characterize those media objects. Once this analysis is complete, a search of the object library 265 is performed to find 375 one or more similar objects in the object library. Insertion of similar media objects serves to ensure that there are no abrupt transitions in the theme or mood of the media stream (such as the abrupt transition that would result from playing a Metallica song between a Sonny and Cher song and a song by Barry Manilow.

Finally, as noted above, a check of the buffer level 365 is also used in alternate embodiments for controlling whether media objects are to be inserted 360 into the buffered media stream 210, or whether the playback of the buffered media stream is to be stretched or compressed 385.

4.0 Additional Embodiments:

As noted above, the media streams customized by the media steam customizer can be derived from any conventional broadcast source, such as, for example, an audio broadcast received via radio, television, the Internet, or other network, or a combined audio/video broadcast received via television, the Internet, or other network. With respect to a combined audio/video broadcast, as is typical with television-type broadcasts, it should be noted that the audio portion of the combined audio/video broadcast is synchronized with the video portion. In other words, as is well known, the audio portion of an audio/video broadcast coincides with the video portion of the broadcast. Consequently, identifying audio objects within the combined audio/video stream is a convenient and computationally inexpensive way to identify video objects within the audio/video stream.

In particular, in one embodiment, audio objects are simply identified in the audio portion of the combined audio/video stream. Since each audio object directly corresponds to a video object, if the identified audio object is in the deletion list, then the endpoints are identified, as described above, and the combined audio/video object is simply deleted from the combined audio/video stream.

For example, in a conventional television broadcast which airs or broadcasts music videos, many commercials or advertisements are interspersed with the music videos of the broadcast stream. Therefore, the incoming audio/video stream is buffered as described above. The audio portion of the buffered stream is then searched for media objects, such as advertisements, commercials or particular music videos that the user does not want to be played. Objects are then identified, and if in the deletion list, they are removed from the buffered media stream. The deleted objects are then replaced, as necessary to maintain the buffer, using audio, or audio/video objects, available to the user's computer system via an object library or network connection, as described above.

Further, in view of the preceding discussion, it should be clear that that the video frame rate of any audio/video media stream playback can be speeded up or slowed down in correspondence with any pitch preserving audio compression or stretching applied to the audio component of the media stream playback.

The foregoing description of the invention has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the systems and methods described herein described herein. It is intended that the scope of the invention be limited not by this detailed description, but rather by the claims appended hereto.

What is claimed is:

1. A system for customizing a partially buffered media stream, comprising using a computing device to:
   partially buffer an incoming media stream;
   begin a playback of the buffered media stream when the buffer reaches a predetermined level, while continuing to buffer the incoming media stream;
   analyze the buffered media stream to identify media objects within the media stream by computing audio fingerprints from the buffered media stream and comparing the computed audio fingerprints to a database of pre-identified audio fingerprints to identify each individual media object;
   deleting media objects from the media stream whenever the identity of particular media objects appears in a list of objects to be deleted; and
   slowing playback of at least a portion of the buffered media stream by applying a pitch-preserving stretching to an audio component of the buffered media stream for at least partially replenishing a decrease in the buffer level which results from deleting media objects from the media stream.

2. The system of claim 1 further comprising determining temporal endpoints of one or more media objects identified in the buffered media stream.

3. The system of claim 2 wherein media objects deleted from the media stream are delimited by their temporal endpoints.

4. The system of claim 1 further comprising cross-fading at least a portion of the media objects immediately adjacent to either side of the media objects deleted from the media stream.

5. The system of claim 1 wherein identifying media objects within the media stream comprises using metadata embedded in the buffered media stream to identify each individual media object.

6. The system of claim 1 wherein identifying media objects within the media stream comprises identifying repeat instances of media objects within the media stream by direct comparison of portions of the media stream which include repeating content to identify each individual media object.

7. The system of claim 1 further comprising a user interface for modifying the list of objects to be deleted.

8. A computer storage medium having computer executable instructions stored therein for at least partially replenishing a buffered media stream from which media objects are deleted during playback of the buffered media stream, comprising:
   partially buffering an incoming media stream, and beginning a buffered playback of the media stream as soon as the buffer reaches a predetermined level; continuing to buffer the incoming media stream during playback of the buffered media stream;
   examining the media stream to identify media objects within the partially buffered media stream, and to identify endpoints of the identified media objects;
   wherein identifying media objects within the media stream comprises computing audio fingerprints from the buffered media stream and comparing the computed audio fingerprints to a database of pre-identified audio fingerprints to identify one or more of the media objects;
   comparing the identify of each identified media object to a user defined deletion list which contains a set of media object identities;
   deleting any identified media object from the buffered media stream whose identity is contained in the deletion list; and additionally replenishing the buffered media stream by slowing a playback speed of at least a portion of the buffered media stream to at least partially compensate for media object deletions from the media stream.

9. The computer storage medium of claim 8 wherein slowing the playback speed of at least a portion of the buffered media stream comprises applying a pitch-preserving stretching of an audio component of the buffered media stream.

10. The computer storage medium of claim 8 wherein identifying the endpoints of the identified media objects is accomplished by direct comparisons of portions of the media stream which include repeating content to identify positions within the buffered media stream where the repeating content diverges.

11. The computer storage medium of claim 8 further comprising mixing at least a portion of the media objects immediately adjacent to either side of the media objects deleted from the media stream.

12. The computer storage medium of claim 8 wherein identifying media objects within the partially buffered media stream comprises using metadata embedded in the buffered media stream to identify one or more of the media objects.

13. The computer storage medium of claim 8 wherein identifying media objects within the media stream comprises identifying repeat instances of media objects within the media stream by direct comparison of portions of the media stream which include repeating content to identify each individual media object.

14. The computer storage medium of claim 8 wherein the predetermined level of the buffered media stream is user adjustable.

15. The computer storage medium of claim 8 wherein the media stream is an audio media stream.

16. The computer storage medium of claim 8 wherein the media stream is a combined audio/video media stream.

17. The computer storage medium of claim 8 wherein the media objects are any of songs, music, advertisements, station identifiers, jingles, speech, and audio/video sequences.

18. A computer-implemented process for real-time customization of a partially buffered media stream, comprising using a computing device to perform steps for:
   receiving a media stream broadcast into a playback buffer;
   beginning a pitch-preserving stretched playback of the media stream broadcast from the playback buffer while continuing to receive the media stream into the playback buffer;
   identifying one or more media objects within the media stream in the playback buffer by performing a comparison of fingerprints generated from the media stream to fingerprints in a media object fingerprint database;
   determining temporal endpoints of one or more of the identified media objects within the media stream in the playback buffer; and
   deleting one or more of the identified media objects from playback buffer under the constraints of the temporal endpoints determined for the deleted media objects.

19. The computer-implemented process of claim 18 wherein deleting one or more of the identified media objects from playback buffer comprises deleting one or more media objects from the playback buffer when those identified media objects are included in a media object deletion list.

20. The computer-implemented process of claim 19 wherein the media object deletion list is automatically populated.

21. The computer-implemented process of claim 19 wherein the media object deletion list is user adjustable via a user interface.

22. The computer-implemented process of claim 18 further comprising monitoring a level of buffered content in the playback buffer and changing the pitch-preserving stretched playback of the media stream to a non-stretched playback whenever the playback buffer level remains above a minimum threshold level.

23. The computer-implemented process of claim 18 further comprising blending at least a portion of the media objects immediately adjacent to either side of media objects deleted from the playback buffer.

24. The computer-implemented process of claim 18 wherein deleting one or more of the identified media objects from playback buffer comprises skipping the playback of the media stream broadcast from the playback buffer ahead to another identified media object within the media stream in the playback buffer.

25. The computer-implemented process of claim 18 wherein identifying one or more media objects within the media stream comprises using metadata embedded in the media stream to identify one or more media objects in the media stream.

26. The computer-implemented process of claim 18 wherein the media stream is a combined audio/video media stream, and wherein video media objects are identified by identifying corresponding audio media objects of the combined audio/video media stream.

27. The computer-implemented process of claim 18 wherein the media objects are any of songs, music, advertisements, station identifiers, jingles, speech, images, and image sequences.

28. A process for customizing playback of a media stream, comprising:
   a step for buffering an incoming media stream a step for providing a pitch-preserving slowed playback of the media stream while continuing to buffer the incoming media stream;
   a step for analyzing the buffered media stream to identify one or more media objects within the media stream during playback of the media stream by computing audio fingerprints from the buffered media stream and comparing the computed audio fingerprints to a database of pre-identified audio fingerprints to identify each individual media object; and
   a step for automatically skipping one or more media objects during playback of the buffered media stream.

29. The process of claim 28 wherein the step for automatically skipping one or more media objects further comprises a step for skipping forward in the playback of the buffered media stream to an identified media object at a subsequent position in the media stream.

30. The process of claim 28 wherein the step for providing the pitch-preserving slowed playback further comprises a step for shifting to a non-slowed playback whenever a level of the buffered media stream is above a predetermined threshold.

31. The process of claim 28 further comprising a step for at least partially cross-fading the media objects immediately adjacent to either side of media objects skipped during playback of the buffered media stream.

* * * * *

UNITED STATES PATENT AND TRADEMARK OFFICE
CERTIFICATE OF CORRECTION

| | | |
|---|---|---|
| PATENT NO. | : 7,526,181 B2 | Page 1 of 1 |
| APPLICATION NO. | : 10/987365 | |
| DATED | : April 28, 2009 | |
| INVENTOR(S) | : Chris Burges et al. | |

It is certified that error appears in the above-identified patent and that said Letters Patent is hereby corrected as shown below:

In column 26, line 6, in Claim 22, delete "pitch -preserving" and insert -- pitch-preserving --, therefor.

In column 26, line 55, in Claim 30, delete "pitch -preserving" and insert -- pitch-preserving --, therefor.

Signed and Sealed this
Third Day of May, 2011

David J. Kappos
*Director of the United States Patent and Trademark Office*